United States Patent
Watanabe et al.

(10) Patent No.: US 12,535,645 B2
(45) Date of Patent: Jan. 27, 2026

(54) OPTICAL FIBER CABLE AND CABLE WITH CONNECTOR

(71) Applicant: SUMITOMO ELECTRIC INDUSTRIES, LTD., Osaka (JP)

(72) Inventors: Akihisa Watanabe, Osaka (JP); Yuuki Shimoda, Osaka (JP); Fumiaki Sato, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 210 days.

(21) Appl. No.: 18/252,608

(22) PCT Filed: Jan. 11, 2022

(86) PCT No.: PCT/JP2022/000533
§ 371 (c)(1),
(2) Date: May 11, 2023

(87) PCT Pub. No.: WO2022/153970
PCT Pub. Date: Jul. 21, 2022

(65) Prior Publication Data
US 2024/0019652 A1    Jan. 18, 2024

(30) Foreign Application Priority Data
Jan. 12, 2021    (JP) .................. 2021-002862

(51) Int. Cl.
*G02B 6/44* (2006.01)
*G02B 6/02* (2006.01)
*G02B 6/38* (2006.01)

(52) U.S. Cl.
CPC ....... *G02B 6/4434* (2013.01); *G02B 6/02042* (2013.01); *G02B 6/3885* (2013.01); *G02B 6/4403* (2013.01)

(58) Field of Classification Search
CPC .............. G02B 6/4434; G02B 6/02042; G02B 6/3885; G02B 6/4403
USPC ............................................ 385/78
See application file for complete search history.

(56) References Cited

U.S. PATENT DOCUMENTS

| 6,101,305 A | 8/2000 | Wagman et al. |
| 6,259,844 B1 | 7/2001 | Logan et al. |
| 2002/0044751 A1 | 4/2002 | Logan et al. |
| 2006/0147165 A1 | 7/2006 | Um et al. |

(Continued)

FOREIGN PATENT DOCUMENTS

| CN | 201130262 Y | 10/2008 | |
| GB | 2159291 A | * 11/1985 | ........... G02B 6/4413 |

(Continued)

OTHER PUBLICATIONS

International Search Report dated Mar. 22, 2022 issued in PCT/JP2022/000533.
Written Opinion dated Mar. 22, 2022 issued in PCT/JP2022/000533.

*Primary Examiner* — Jerry M Blevins
(74) *Attorney, Agent, or Firm* — McDonald Hopkins LLC

(57) ABSTRACT

An optical fiber cable includes a central tensile strength member, a plurality of optical fibers disposed around the central tensile strength member, a set of tensile strength members arranged outside the plurality of optical fibers, and a sheath disposed outside the plurality of optical fibers, in which at least four sets of the tensile strength member are spaced apart from one another and embedded in the sheath.

9 Claims, 2 Drawing Sheets

(56) References Cited

U.S. PATENT DOCUMENTS

| | | | |
|---|---|---|---|
| 2011/0110635 A1 | 5/2011 | Toge et al. | |
| 2012/0106906 A1 | 5/2012 | Sakabe et al. | |
| 2014/0241677 A1* | 8/2014 | Sutehall | G02B 6/4436 |
| | | | 385/104 |
| 2021/0223491 A1 | 7/2021 | Shimizu et al. | |
| 2022/0171146 A1 | 6/2022 | Shimizu et al. | |
| 2022/0365300 A1 | 11/2022 | Sato et al. | |

FOREIGN PATENT DOCUMENTS

| | | | | |
|---|---|---|---|---|
| JP | 2000-089068 A | | 3/2000 | |
| JP | 2006-514333 A | | 4/2006 | |
| JP | 2010-008923 A | | 1/2010 | |
| JP | 2011257603 A | * | 12/2011 | G02B 6/448 |
| JP | 2013-142853 A | | 7/2013 | |
| JP | 2014-071441 A | | 4/2014 | |
| JP | 2015-517679 A | | 6/2015 | |
| JP | 2020-079876 A | | 5/2020 | |
| JP | 2020204752 A | * | 12/2020 | |
| WO | 2004/077120 A1 | | 9/2004 | |
| WO | 2013/165407 A1 | | 11/2013 | |
| WO | 2020-075734 A1 | | 4/2020 | |

* cited by examiner

OPTICAL FIBER CABLE AND CABLE WITH CONNECTOR

TECHNICAL FIELD

The present disclosure relates to an optical fiber cable and a cable with a connector.

This application claims priority based on Japanese Patent Application No. 2021-002862 filed on Jan. 12, 2021, the contents of which are incorporated herein by reference in its entirety.

BACKGROUND ART

In the related art, as a microduct cable that is routed to a thin pipe by pneumatic feeding or pulling, a loose tube type cable is known, which is an optical fiber unit with a bundle of a plurality of optical fibers covered with a resin tube and then with a cable sheath. A slotless cable is also known, which omits the resin tube and has optical fibers mounted at high density inside the cable sheath (for example, Patent Literatures 1, 2, and 3).

CITATION LIST

Patent Literature

Patent Literature 1: JP2015-517679T
Patent Literature 2: JP2010-008923A
Patent Literature 3: JP2014-071441A

SUMMARY OF INVENTION

The optical fiber cable of the present disclosure includes
a central tensile strength member,
a plurality of optical fibers arranged around the central tensile strength member,
a set of tensile strength members arranged outside the plurality of optical fibers, and
a sheath disposed outside the plurality of optical fibers, in which
at least four sets of tensile strength members are spaced apart from one another and embedded in the sheath.
The cable with a connector of the present disclosure includes
the optical fiber cable, and
a multi-core connector attached to the plurality of optical fibers at one end of the optical fiber cable.

DESCRIPTION OF EMBODIMENTS

Figure 1:
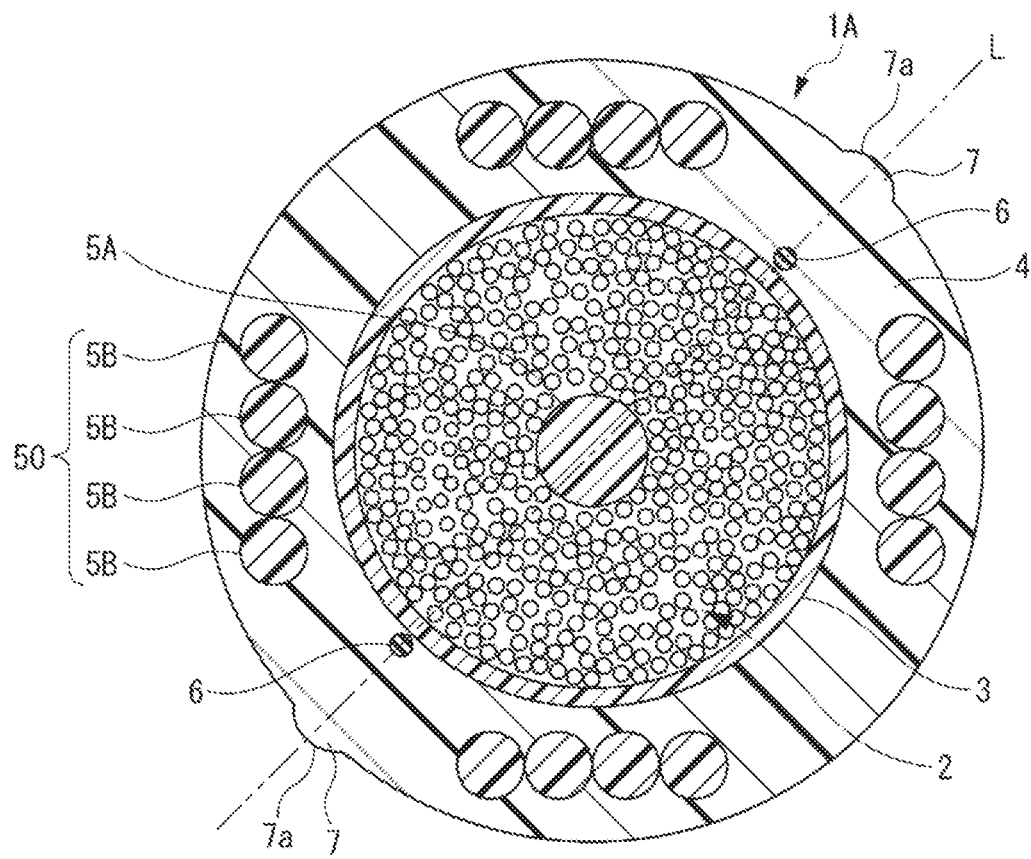
FIG. 1 is a cross-sectional view of an optical fiber cable according to a first embodiment.

Problems to be Solved by Present Disclosure

A loose tube type cable includes a tension member in the center. Therefore, there is no anisotropy in the bending direction, and it is easy to wire by pneumatic feeding. However, the resin tube film that covers the optical fiber unit is generally formed thick. Therefore, it is difficult to reduce the outer diameter of the loose tube type cable and mount the optical fibers at high density.

On the other hand, since the slotless cable does not have a resin tube, it is possible to mount optical fibers at high density. However, in the slotless cable, since a plurality of tension members are embedded in the sheath, the rigidity of the cable varies according to the positions where the tension members are embedded. As a result, anisotropy can occur in the bending direction, and buckling can occur during pneumatic feeding.

Further, when a cable is laid in a duct by pneumatic feeding, it is generally preferable that the cable has a small diameter and a light weight and that the thickness of the cable sheath is thin, so as to extend the pneumatic distance. Meanwhile, when the cable is laid in the duct by pulling, the cable may be stretched by the pulling force. When the pneumatic feeding cable is laid in the duct by pulling, there is a concern that the pneumatic feeding cable can be stretched and the transmission loss of the optical fiber can be adversely affected.

The present disclosure provides an optical fiber cable and a cable with a connector that is easy to wire by pneumatic feeding and pulling.

Description of Embodiment of Present Disclosure

First, embodiments of the present disclosure will be listed and described.

(1) An optical fiber cable according to an aspect of the present disclosure includes
a central tensile strength member,
a plurality of optical fibers arranged around the central tensile strength member,
a set of tensile strength members arranged outside the plurality of optical fibers, and
a sheath disposed outside the plurality of optical fibers, in which
at least four sets of tensile strength members are spaced apart from one another and embedded in the sheath.

According to the optical fiber cable of the present disclosure, since at least four sets of tensile strength members are spaced apart from one another and embedded in the sheath, the non-uniformity of the cable rigidity due to the positions where the set of the tensile strength members are embedded is improved, and the cable is less likely to buckle during pneumatic feeding. In addition, since the optical fiber cable of the present disclosure includes the central tensile strength member as well as the set of tensile strength members embedded in the sheath, the cable is less likely to stretch when pulled. Therefore, wiring by pneumatic feeding and pulling is facilitated.

(2) At least one of the central tensile strength member and the set of the tensile strength members may include aramid fiber reinforced plastic.

According to the present disclosure, since the central tensile strength member or the set of tensile strength members includes aramid fiber reinforced plastic, the optical fiber cable includes a lightweight and highly flexible tensile strength member, thus facilitating wiring by pneumatic feeding and pulling.

(3) The central tensile strength member may include aramid fiber reinforced plastic and have a diameter of 3 mm or less.

According to the present disclosure, since the central tensile strength member includes aramid fiber reinforced plastic, the optical fiber cable includes a lightweight and highly flexible tensile strength member. In addition, if the central tensile strength member is too thick, a plurality of optical fibers in the cable are likely to be mounted without gaps as lateral pressure is applied to each other. As a result, the cable transmission losses can be increased. However, since the diameter of the central tensile strength member of the present disclosure is 3 mm or less, it is possible to suppress stretching of the cable during pulling while suppressing the cable transmission loss.

(4) The sheath may include 1.5% by mass or more of release agent.

Since the sheath of the present disclosure includes 1.5% by mass or more of release agent, wiring by pneumatic feeding is facilitated.

(5) The sheath may include a flame retardant inorganic material with an oxygen index of 50 or higher.

Since the sheath of the present disclosure includes the flame retardant inorganic material with the oxygen index of 50 or higher, the flame retardancy of the optical fiber cable is further improved.

(6) The sheath includes an outer layer and an inner layer. The inner layer may include a flame retardant inorganic material. The outer layer may include a release agent.

According to the present disclosure, the inner layer of the sheath includes flame retardant inorganic materials, so that the flame retardancy of the optical fiber cable can be improved. In addition, since the outer layer of the sheath includes the release agent, wiring by pneumatic feeding is facilitated.

(7) The plurality of optical fibers may be in a form of optical fiber ribbons with adhesive parts and non-adhesive parts arranged in parallel in a direction orthogonal to the longitudinal direction, in which, in some or all of the plurality of optical fibers, adhesive parts in a state in which adjacent optical fibers are connected to each other and non-adhesive parts in a state in which adjacent optical fibers are not connected to each other are provided intermittently in the longitudinal direction.

Since the optical fiber cable of the present disclosure can use optical fiber ribbon with fiber adhesive parts and non-adhesive parts, it is excellent in cable housing and can be easily separated into single fibers.

(8) Each of the plurality of optical fibers may be a multi-core fiber.

Since the multiple optical fibers of the present disclosure are multi-core fibers, the transmission capacity of the optical fiber cable can be increased.

(9) A cable with a connector according to an aspect of the present disclosure may include
the optical fiber cable described above, and
a multi-core connector attached to the plurality of optical fibers at one end of the optical fiber cable.

Such a configuration facilitates cable connection.

Effects of Invention

According to the present disclosure, it is possible to provide an optical fiber cable that is easy to wire by pneumatic feeding and pulling, and a cable with a connector.

Details Of Embodiments Of Present Disclosure

Specific examples of an optical fiber cable according to an embodiment of the present disclosure will be described with reference to the drawings.

Note that the present disclosure is not limited to these examples, but is indicated by the claims and intended to include all modifications within the scope and meaning equivalent to the scope of the claims.

First Embodiment

An optical fiber cable 1A according to a first embodiment will be described with reference to FIGS. 1 and 2.

FIG. 1 is a cross-sectional view of the optical fiber cable 1A viewed from a direction perpendicular to the longitudinal direction. As shown in FIG. 1, the optical fiber cable 1A includes a central tensile strength member 5A, a plurality of optical fibers in the form of a plurality of optical fiber ribbons 2, a water absorbing tape 3, a sheath 4, a plurality of tensile strength members 5B (set 50 of tensile strength members), at least one tear string 6 (fibrous inclusion), and a plurality of protrusions 7. The cable outer diameter of the optical fiber cable 1A is 10 mm, for example.

The central tensile strength member 5A is arranged along the longitudinal direction of the optical fiber cable 1A. The cross section of the central tensile strength member 5A is formed in a circular shape in the direction orthogonal to the longitudinal direction. The diameter of the central tensile strength member 5A is 3 mm or less, for example 2.5 mm. The central tensile strength member 5A includes aramid fiber reinforced plastic. The central tensile strength member 5A may be made of fiber reinforced plastic (FRP) such as glass fiber reinforced plastic or carbon fiber reinforced plastic, or liquid crystal polymer. The central tensile strength member 5A is preferably non-inductive.

The plurality of optical fiber ribbons 2 are arranged around the central tensile strength member 5A and are a plurality of optical fibers in the form of the plurality of optical fiber ribbons 2. Each optical fiber ribbon 2 includes a plurality of optical fibers.

Figure 2:
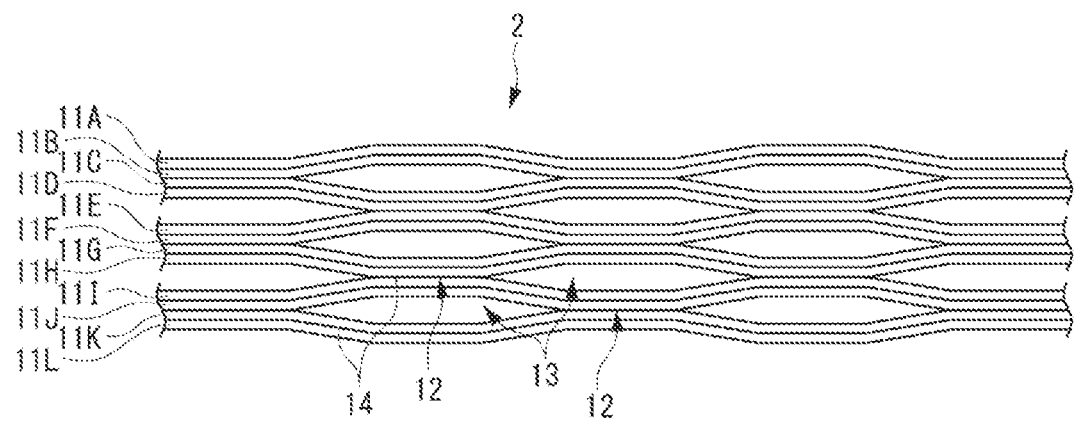
FIG. 2 is a partial development view showing an optical fiber ribbon housed in an optical fiber cable in a longitudinal direction.

FIG. 2 shows a partial development view of an example of the optical fiber ribbon 2 housed in the optical fiber cable 1A shown in its longitudinal direction. As shown in FIG. 2, the optical fiber ribbon 2 is an optical fiber ribbon with fiber adhesive parts and non-adhesive parts arranged in parallel in a direction orthogonal to a longitudinal direction of a plurality of optical fibers 11A to 11L, in which, in some or all of the plurality of optical fibers 11A to 11L, adhesive parts 12 in which the adjacent optical fibers are connected to each other and non-adhesive parts 13 in which the adjacent optical fibers are not connected to each other are provided intermittently in the longitudinal direction. The outer diameter of each of the optical fibers 11A to 11L is 200 µm, for example, but may be 250 µm or 180 µm. In addition, each of the optical fibers 11A to 11L of this example may be a multi-core fiber. Alternatively, only some of the optical fiber ribbons 2 may be the optical fiber ribbons with fiber adhesive parts and non-adhesive parts, and only some of the optical fibers 11A to 11L may be multi-core fibers.

The optical fiber ribbon 2 of this example has 12 optical fibers 11A to 11L arranged in parallel. The positions where the adhesive parts 12 and the non-adhesive parts 13 are intermittently provided may be between some of the optical fibers (in every second core) as shown in FIG. 2, or between all the optical fibers (in every core). FIG. 2 is an example of providing in every second core, and there is no non-adhesive part 13 provided between the optical fibers 11A and 11B, 11C and 11D, 11E and 11F, 11G and 11H, 11I and 11J, and 11K and 11L.

The adhesive part 12 in the optical fiber ribbon 2 is formed by applying, between the optical fibers, a connecting resin 14 made of an ultraviolet curable resin, a thermosetting resin, or the like, for example. By applying the connecting resin 14 between certain optical fibers, the adhesive parts 12 and the non-adhesive parts 13 are intermittently provided, and also the respective optical fibers 11A to 11L are integrated in a parallel state. The connecting resin 14 may be applied to only one surfaces of the parallel surfaces formed by the optical fibers 11A to 11L arranged in parallel, or may be applied to both surfaces thereof. Further, the optical fiber ribbon 2 may be manufactured by applying a tape resin to one sides or both sides of the optical fibers 11A to 11L arranged in parallel to connect all the optical fibers 11A to 11L, for example, and then cutting a part of the core wire with a rotating blade or the like to form the non-adhesive part 13.

As shown in FIG. 1, the water absorbing tape 3 is wound, for example, longitudinally or spirally around the entirety of the plurality of optical fiber ribbons 2 so as to cover the periphery of the plurality of optical fiber ribbons 2. For example, a water absorbing tape 3 is treated with water absorbing processing by adhering water absorbing powder to a base fabric made of polyester or the like. The thickness of the water absorbing tape 3 is 0.3 mm, for example. In this example, the optical fiber cable 1A includes the water absorbing tape 3, but the optical fiber cable 1A may not include the water absorbing tape 3.

The sheath 4 is arranged outside the plurality of optical fiber ribbons 2 and provided so as to enclose the tensile strength members 5B (the set 50 of tensile strength members). In this example, the sheath 4 is provided so as to cover the periphery of the water absorbing tape 3. The thickness of the sheath 4 is 1.0 mm, for example. The sheath 4 is mainly made of vinyl resin such as polyvinyl chloride (PVC) or polyolefin resin such as polyethylene (PE), for example. Furthermore, the sheath 4 includes flame retardant inorganic materials and a release agent. Examples of the flame retardant inorganic materials include polyvinyl chloride, flame retardant polyethylene, and the like. Moreover, the sheath 4 includes 1.5% by mass or more of a release agent. Examples of the release agents include silicon-based release agents such as silicon and siloxane. In addition, if more than 2.5 wt % of release agent is added, the collapse of winding of the optical fiber cable occurs, and the handleability deteriorates, and accordingly, the addition ratio of the release agent is preferably 1.5 wt % or more and 2.5 wt % or less.

More specifically, the sheath 4 includes a flame retardant inorganic material with an oxygen index of 50 or higher. The oxygen index, as described in JIS, K7201-2 (2007), is one index of flame retardancy of plastic materials. The oxygen index referred to herein is an index expressed as a percentage to indicate the minimum oxygen concentration required for the plastic to continue to ignite. The oxygen index of general air is 20, and the oxygen index of 20 is used as a standard to indicate the flame retardancy of plastic materials. For example, materials with the oxygen index of 22 or less are combustible, materials with the oxygen index of 23 to 27 are combustible but self-extinguishing, and materials with the oxygen index of 27 or higher are flame retardant. Since the sheath 4 of this example has the oxygen index of or higher, it can be said to be flame retardant. In addition, the upper limit of the oxygen index is 100.

Each tensile strength member 5B is arranged along the longitudinal direction of the optical fiber cable 1A and provided so as to be embedded in the sheath 4. The diameter of each tensile strength member 5B is 0.5 mm, for example. Each tensile strength member 5B includes aramid fiber reinforced plastic. Each tensile strength member 5B may be made of fiber reinforced plastic (FRP) such as glass fiber reinforced plastic or carbon fiber reinforced plastic, or liquid crystal polymer. Each tensile strength member 5B is preferably non-inductive. The fiber reinforced plastic (FRP) is generally a combustible material. From the viewpoint of improving the flame retardancy of the entire optical fiber cable 1A, it is preferable that each tensile strength member 5B be arranged inside the sheath 4 at a position near the center of the optical fiber cable 1A rather than near the surface layer of the sheath 4.

The cross section of each tensile strength member 5B is formed in a circular shape in the direction orthogonal to the longitudinal direction. As shown in FIG. 1, in the present disclosure, the plurality of tensile strength members 5B are formed in a set of four each. The four tensile strength members 5B in a set are provided in close proximity to, or in contact at least partially with each other, for example. In this example, the four tensile strength members are arranged in a line. In the following description, the four tensile strength members 5B in a set are collectively referred to as the set 50 of tensile strength members. In the present disclosure, the optical fiber cable 1A includes at least four sets 50 of tensile strength members.

In this example, the four sets 50 of tensile strength members are spaced apart from one another and embedded in the sheath 4. In the optical fiber cable 1A, the four sets 50 of tensile strength members are arranged at regular intervals. Specifically, regarding the four sets of tensile strength members, in the cross section of the optical fiber cable 1A in the direction orthogonal to the longitudinal direction, the four sets 50 of tensile strength members are provided one by one at positions facing each other across the center of the optical fiber cable 1A.

The tear string 6 is provided for tearing the sheath 4 and is arranged in the sheath 4 along the longitudinal direction of the optical fiber cable 1A. In this example, two tear strings 6 are provided. The two tear strings 6 are provided at substantially intermediate positions between adjacent sets 50 of tensile strength members so as to face each other. In addition, the four sets 50 of tensile strength members are arranged line-symmetrically with respect to a straight line L connecting the tear strings 6 and the center of the optical fiber cable 1A in the cross-sectional view of the cable. By pulling out the tear strings 6, the operator can tear the sheath 4 in the longitudinal direction and take out the optical fiber ribbon 2. The tear strings 6 are fibrous and made of a plastic material (for example, polyester) that is resistant to tension, for example.

A plurality (two, in this example) of protrusions 7 are provided. The two protrusions 7 are provided along the longitudinal direction of the optical fiber cable 1A. Each protrusion 7 may be provided continuously along the longitudinal direction, or may be provided intermittently. The two protrusions 7 are provided so as to face each other across the center of the optical fiber cable 1A in the circumferential direction of the sheath 4 in the radial cross section of the optical fiber cable 1A. In this example, the protrusions 7 are provided on the straight line L connecting the tear strings 6 and the center of the optical fiber cable 1A. The protrusions 7 are formed on the outer peripheral portion of the sheath 4 so as to protrude in the radial direction of the optical fiber cable 1A. The protrusion 7 has a curved surface 7a in the protruding direction. The protrusions 7 are integrally formed with the sheath 4 by extrusion. The positions of the tear strings 6 can be easily recognized by the presence of the protrusions 7. Further, since the friction between the sheath 4 and the duct is reduced, the pneumatic distance can be extended.

As described above, in the present embodiment, since at least four sets 50 of tensile strength members spaced apart from one another are embedded in the sheath 4, the non-uniformity in rigidity of the optical fiber cable 1A due to the positions where the sets 50 of tensile strength members are embedded is improved. Therefore, the optical fiber cable 1A is less likely to buckle during pneumatic feeding. Further, since the optical fiber cable 1A of the present embodiment includes the central tensile strength member 5A as well as the sets 50 of tensile strength members embedded in the sheath 4, the optical fiber cable 1A is less likely to stretch when pulled. Therefore, wiring of the optical fiber cable 1A by pneumatic feeding and pulling is facilitated.

Since the central tensile strength member 5A or the sets 50 of tensile strength members of the present embodiment includes aramid fiber reinforced plastic, the optical fiber cable 1A has a lightweight and highly flexible tensile strength member, thereby facilitating wiring by pneumatic feeding and pulling.

Since the central tensile strength member 5A of the present embodiment includes aramid fiber reinforced plastic, the optical fiber cable 1A includes a lightweight and highly flexible tensile strength member. In addition, if the central tensile strength member 5A is too thick for the diameter of the optical fiber cable 1A, it is more likely that the plurality of optical fiber ribbons 2 in the cable are mounted without gaps as lateral pressure is applied on each other. As a result, the cable transmission losses can be increased. However, since the diameter of the central tensile strength member 5A of the present embodiment is 3 mm or less, it is possible to suppress stretching of the cable during pulling while suppressing the cable transmission loss.

Since the sheath of the present embodiment includes 1.5% by mass or more of release agent, wiring of the optical fiber cable 1A by pneumatic feeding is facilitated.

Since the sheath 4 of the present embodiment includes the flame retardant inorganic materials with the oxygen index of 50 or higher, the flame retardancy of the optical fiber cable 1A is further improved.

Since the optical fiber cable 1A of the present embodiment can use the optical fiber ribbon with fiber adhesive parts and non-adhesive parts, it is excellent in cable housing and can be easily separated into single fibers.

In the plurality of optical fiber ribbons 2 of the present embodiment, each of the optical fibers 11A to 11L can also use multi-core fibers, so that the transmission capacity of the optical fiber cable can be increased. Each optical fiber of the optical fiber ribbon 2 may have two cores or eight cores. For example, when the optical fiber cable 1A houses 36 optical fiber ribbons 2, each optical fiber of each optical fiber ribbon 2 has two cores, and when the cable outer diameter of the optical fiber cable 1A is 10 mm, mounting at high density of 11 cores/mm$^2$ or more per cross-sectional area of the cable can be achieved.

Since the optical fiber cable 1A of the present embodiment is provided with the tear strings 6 arranged along the plurality of optical fiber ribbons 2, an operator can tear the sheath 4 with the tear strings 6 and easily take out the individual optical fiber ribbons 2. Furthermore, since the four sets 50 of tensile strength members of the optical fiber cable 1A are arranged symmetrically with respect to the straight line L connecting the tear strings 6 and the center of the optical fiber cable 1A, the non-uniformity of the rigidity of the cable is further improved, and the wiring work during pneumatic feeding is further improved.

According to the optical fiber cable 1A of the present embodiment, the plurality of protrusions 7 protruding in the radial direction of the optical fiber cable 1A are provided on the outer peripheral portion of the sheath 4. Therefore, when the optical fiber cable 1A is pneumatically fed through the duct, the protrusions 7 come into contact with the inner wall of the duct, and accordingly, the contact area between the sheath 4 and the duct can be reduced. As a result, the friction between the sheath 4 and the duct can be reduced, and the pneumatic distance can be extended.

In FIG. 1, one set 50 of tensile strength members includes four tensile strength members 5B, but the number of tensile strength members 5B is not limited. One set 50 of tensile strength members may include one, two, or five or more tensile strength members 5B.

Although FIG. 2 shows the optical fiber ribbon with adhesive parts and non-adhesive parts of 12 optical fibers, the number of optical fibers is not limited thereto. In addition, the plurality of optical fibers may be formed by twisting a plurality of single-core optical fibers rather than the ribbons.

Modification Of First Embodiment

An optical fiber cable 1B according to a modification of the first embodiment will be described with reference to FIG. 3. It is to be noted that the same reference numerals are assigned to the same configurations as those of the optical fiber cable 1A according to the first embodiment, and the description thereof will be omitted.

Figure 3:
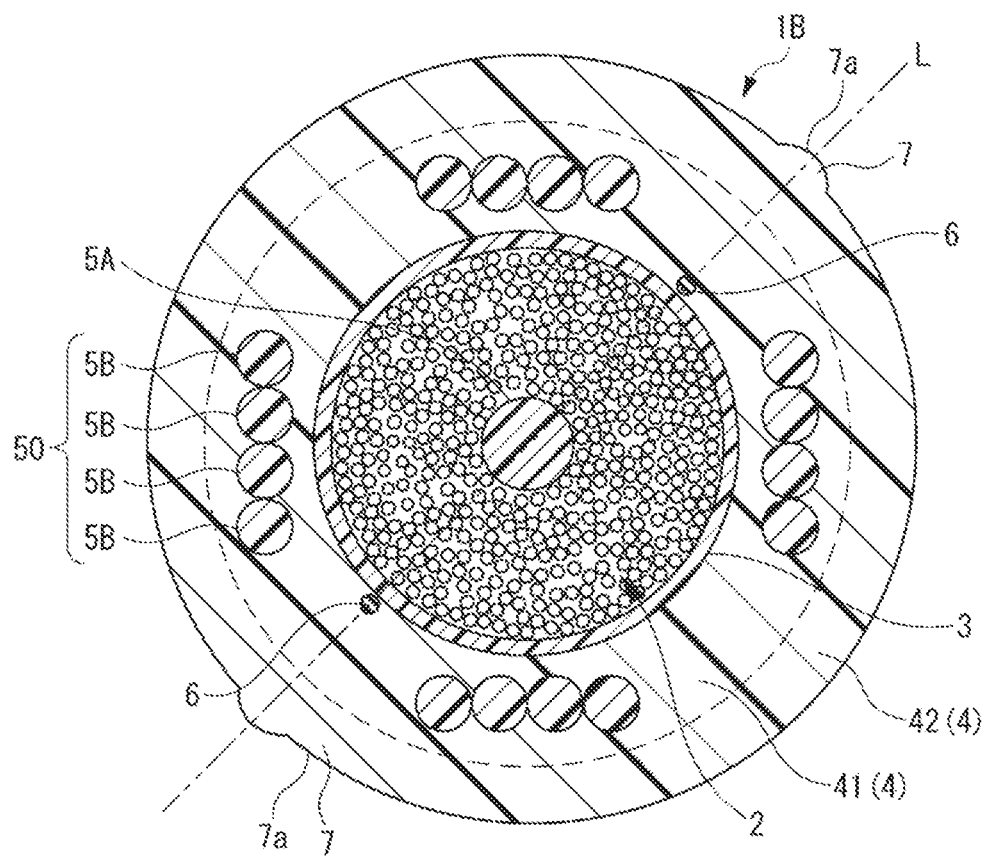
FIG. 3 is a cross-sectional view of an optical fiber cable according to a modification of the first embodiment.

FIG. 3 is a cross-sectional view of the optical fiber cable 1B viewed from a direction perpendicular to the longitudinal direction. As shown in FIG. 3, in the optical fiber cable 1B, the sheath 4 includes an inner layer 41 and an outer layer 42, in addition to the configuration of the optical fiber cable 1A according to the first embodiment. The cable outer diameter of the optical fiber cable 1B is 12 mm, for example.

The inner layer 41 of the sheath 4 is arranged outside the plurality of optical fiber ribbons and provided to enclose a plurality of sets 50 of tensile strength members. The plurality of sets 50 of tensile strength members and the tear strings 6 are embedded in the inner layer 41 of the sheath 4. For example, the inner layer 41 of the sheath 4 includes magnesium hydroxide or aluminum hydroxide as a flame retardant inorganic material. The thickness of the inner layer 41 is 1 mm, for example.

The outer layer 42 of the sheath 4 is arranged outside the inner layer 41. The protrusion 7 is provided on the outer peripheral portion of the outer layer 42. The outer layer 42 of the sheath 4 includes a silicone-based release agent such as silicone or siloxane as a release agent. The thickness of the outer layer 42 is 0.5 mm, for example.

As described above, in this modification, since the inner layer 41 includes the flame retardant inorganic material, it is possible to realize the optical fiber cable 1B having excellent flame retardancy. In addition, since the outer layer 42 includes the release agent, the optical fiber cable 1B can be fed smoothly even in the duct during pneumatic feeding. This facilitates wiring.

Figure 4:
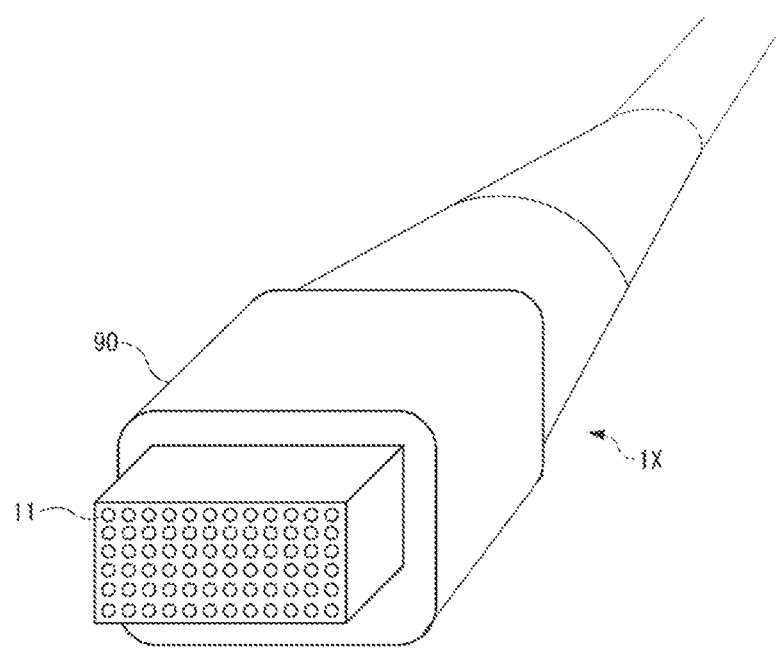
FIG. 4 is a schematic perspective view of a cable with a connector, in which an optical fiber cable is terminated.

While certain embodiment and modification of the present disclosure have been described above, the present disclosure is not limited to the above embodiment or modification, and other modifications can be adopted for part of the configuration as necessary. For example, as shown in FIG. 4, the optical fiber cable 1A or the optical fiber cable 1B may be terminated. A cable 1X with a connector shown in FIG. 4 includes a multi-core connector 90 attached to the plurality of optical fiber ribbons 2 at one end of the optical fiber cable 1A or the optical fiber cable 1B. As shown in FIG. 4, the optical fibers 11 are exposed at an end of the multi-core connector 90. The number of optical fibers 11 shown in FIG. 4 is an example, and is not particularly limited as long as there are at least 12 of these. The optical fiber 1X with a connector may have 432 optical fibers, for example. By providing the multi-core connector 90 in advance at one end of the optical fiber cable 1A or the optical fiber cable 1B, workability can be facilitated when optically connecting the optical fiber cable 1A or the optical fiber cable 1B.

(Evaluation Test)

The allowable tension, pneumatic distance, cable transmission loss, and mounting density of the optical fiber cable 1A according to the first embodiment were evaluated. In the evaluation test, the central tensile strength member 5A and the plurality of tensile strength members 5B (set 50 of tensile strength members) are aramid fiber reinforced plastics with a tensile modulus of elasticity of 6300 kg/mm². As a method for evaluating the allowable tension, when tension was applied to the optical fiber cable 1A, the tension when the cable length was stretched by 0.3% was measured as the allowable tension.

As a method for evaluating the pneumatic distance, a microduct pumping test defined by the International Electrotechnical Commission (IEC) was used. A general-purpose microduct was used in the pneumatic distance test. The inner diameter of the duct was 20 mm. The total pneumatic distance in the duct was set to 1000 m or more, and the duct was arranged so as to be turned back every 100 m. The radius of curvature of the duct was 40 times the outer diameter of the duct. The pressure in the duct was 1.3 MPa to 1.5 MPa.

As a method for evaluating the cable loss characteristics, it was evaluated whether or not the transmission loss was less than 0.3 dB/km when light with a wavelength of 1.55 μm was incident on the fiber cable 1A.

In addition, as a method for evaluating the mounting density, the housing rate when 36 optical fiber ribbons 2 were housed in the optical fiber cable 1A was evaluated as a percentage. The cable outer diameter of the optical fiber cable 1A was 11 mm, and the diameter (core diameter) of the space housing the plurality of optical fiber ribbons 2 and the central tensile strength member 5A was 9 mm. In the optical fiber ribbon 2 in which 12 optical fibers having a diameter of 250 μm were arranged in parallel, the tape width of the optical fiber ribbon 2 was 3.1 mm and the tape thickness was 0.3 mm. The mounting density was calculated by assuming that the area of each optical fiber ribbon 2 was 0.786 mm² including the tolerance. Table 1 shows the evaluation results.

TABLE 1

| Sample No. | Cable structure | Tensile strength member 5B | | Central tensile strength member 5A | | Allowable tension (N) | Pneumatic distance (m) | Cable transmission loss | Mounting density (%) |
| --- | --- | --- | --- | --- | --- | --- | --- | --- | --- |
| | | Diameter (mm) | Number (numbers) | Diameter (mm) | Number (numbers) | | | | |
| 1 | Slotless cable | 0.7 | 2 | None | None | 109 | 600 | 0.2 dB/km or less | 45 |
| 2 | Plurality of tensile strength members 5B only (without central tensile strength member 5A) | 0.5 | 16 | None | None | 582 | 1500 | 0.2 dB/km or less | 45 |
| 3 | Optical Fiber cable 1A | 0.5 | 16 | 2.0 | 1 | 1163 | 1450 | 0.25 dB/km or less | 47 |
| 4 | Optical Fiber cable 1A | 0.5 | 16 | 2.5 | 1 | 1490 | 1410 | 0.25 dB/km or less | 48 |
| 5 | Optical Fiber cable 1A | 0.5 | 16 | 3.0 | 1 | 1890 | 1360 | less than 0.3 dB/km | 50 |
| 6 | Optical Fiber cable 1A | 0.5 | 16 | 3.5 | 1 | 2363 | 1310 | 0.3 dB/km or more | 53 |

In Table 1, sample Nos. 1 and 2 are comparative examples. The cable structure of sample No. 1 is a slotless cable, and the tensile strength members included in the sheath are arranged one by one on the upper and lower ends of the cables in the radial direction with the center of the cables interposed therebetween. The diameter of the tensile strength member of sample No. 1 is 0.7 mm. The tensile strength member of sample No. 1 is glass fiber reinforced plastic. Sample No. 2 is an optical fiber cable in which 16 tensile strength members 5B are embedded in the sheath, but the central tensile strength member 5A is not provided. Specifically, four tensile strength members 5B are arranged in a row in one set 50 of tensile strength members, and four sets 50 of tensile strength members are provided one by one in the upper, lower, left, and right positions facing each other across the center of the cable in the cross section of the cable in the radial direction. The diameter of the tensile strength member 5B of sample No. 2 is 0.5 mm.

Sample Nos. 3 to 6 are the optical fiber cables 1A according to the first embodiment. However, each sample has a different diameter of the central tensile strength member 5A. The diameter of the central tensile strength member 5A of sample No. 3 is 2.0 mm. The diameter of the central tensile strength member 5A of sample No. 4 is 2.5 mm. The diameter of the central tensile strength member 5A of sample No. 5 is 3.0 mm. The diameter of the central tensile strength member 5A of sample No. 6 is 3.5 mm.

As shown in Table 1, the allowable tension of sample No. 1 is 109 N, and the allowable tension of sample No. 2 is 582 N. Meanwhile, it was confirmed that all allowable tensions of sample Nos. 3 to 6 were 1000 N or more. In general, wiring by pulling requires a tension of 1000 N or more. Moreover, it was confirmed that the allowable tension of sample No. 3 provided with the central tensile strength member 5A was about twice the allowable tension of sample No. 2 not provided with the central tensile strength member 5A. From the above, it was confirmed that the optical fiber cable 1A that can be wired by pulling can be obtained by providing the central tensile strength member 5A.

Sample Nos. 2 to 6 all had pneumatic distances of 1000 m or more, but the pneumatic distance of sample No. 1 did not reach 1000 m. From the above, it was confirmed that the pneumatic distance of the optical fiber cable 1A is ensured by embedding the 16 tensile strength members 5B in the sheath 4.

As shown in Table 1, sample No. 6 had the cable transmission loss of 0.3 dB/km or more and the mounting density of 53%. This is because the diameter of the central tensile strength member 5A of sample No. 6 is 3.5 mm, which is relatively large compared to the diameter of the optical fiber cable 1A. That is, in sample No. 6, it was confirmed that the mounting density was high and the cable transmission loss was high, because the plurality of optical fiber ribbons 2 in the cable were easily mounted without gaps as lateral pressure is exerted on each other. Meanwhile, it was confirmed that the cable transmission losses of sample Nos. 3 to 5 were all less than 0.3 dB/km. From the above, it was confirmed that, when the diameter of the central tensile strength member 5A is 3.0 mm or less, the optical fiber cable 1A with less cable transmission loss can be realized, with the optical fiber ribbons 2 being mounted at high density in the cable.

Furthermore, the flame retardant performance of the optical fiber cable 1A was evaluated. As a method for evaluating flame retardant performance, a test according to the standards defined by the European Construction Products Regulation (CPR) was used. The flame retardant performance was evaluated in seven grades of Aca, B1ca, B2ca, Cca, Dca, Eca, and Fca, with Aca having the highest flame retardant performance and Fca having the lowest flame retardant performance. As a result of the evaluation test, it was confirmed that all sample Nos. 3 to 6 corresponded to Cca and had high flame retardant performance.

As described above, while the present disclosure has been described in detail and with reference to specific embodiments thereof, it will be apparent to those skilled in the art that various changes and modifications can be made without departing from the spirit and scope of the present disclosure. Further, the number, the position, the shape, and the like of the above-described constituent members are not limited to the above embodiments, and can be changed to a suitable number, position, shape, and the like for implementing the present disclosure.

REFERENCE SIGNS LIST 1A, 1B: optical fiber cable
1X: cable with connector
2: optical fiber ribbon
3: water absorbing tape
4: sheath
5A: central tensile strength member
5B: tensile strength member
6: tear string (fibrous inclusion)
7: protrusion
7a: surface
11A to 11L: optical fibers
12: adhesive part
13: non-adhesive part
14: connecting resin
41: inner layer
42: outer layer
50: set of tensile strength members
90: multi-core connector

What is claimed is:

1. An optical fiber cable comprising:
a central tensile strength member;
a plurality of optical fibers arranged around the central tensile strength member;
a set of tensile strength members arranged outside the plurality of optical fibers; and
a sheath disposed outside the plurality of optical fibers, wherein
at least four sets of tensile strength members are spaced apart from one another and embedded in the sheath, and
wherein an allowable tension of the optical fiber cable is 1890 N or more and 2363 N or less.

2. The optical fiber cable according to claim 1, wherein at least one of the central tensile strength member and the set of the tensile strength members includes aramid fiber reinforced plastic.

3. The optical fiber cable according to claim 1, wherein the central tensile strength member includes aramid fiber reinforced plastic and has a diameter of 3 mm or less.

4. The optical fiber cable according to claim 1, wherein the sheath includes 1.5% by mass or more of release agent.

5. The optical fiber cable according to claim 1, wherein the sheath includes a flame retardant inorganic material with an oxygen index of 50 or higher.

6. The optical fiber cable according to claim 1, wherein the sheath includes an outer layer and an inner layer,
the inner layer includes a flame retardant inorganic material, and
the outer layer includes a release agent.

7. The optical fiber cable according to claim 1, wherein the plurality of optical fibers are in a form of optical fiber ribbons with adhesive parts and non-adhesive parts arranged in parallel in a direction orthogonal to the longitudinal direction, wherein, in some or all of the plurality of optical fibers, adhesive parts in a state in which adjacent optical fibers are connected to each other and non-adhesive parts in a state in which adjacent optical fibers are not connected to each other are provided intermittently in the longitudinal direction.

8. The optical fiber cable according to claim 1, wherein each of the plurality of optical fibers is a multi-core fiber.

9. A cable with a connector comprising:
the optical fiber cable according to claim 1; and
a multi-core connector attached to the plurality of optical fibers at one end of the optical fiber cable.

* * * * *